United States Patent [19]
Koslow et al.

[11] Patent Number: 6,022,436
[45] Date of Patent: *Feb. 8, 2000

[54] ELECTRODE MANUFACTURING PROCESS AND FLOW-THROUGH CAPACITOR PRODUCED THEREFROM

[75] Inventors: Evan E. Koslow, Weston; Richard D. Kendrick, Stratford; Gordon Spilkin, Stamford, all of Conn.

[73] Assignee: Koslow Technologies Corporation, Orange, Conn.

[ * ] Notice: This patent is subject to a terminal disclaimer.

[21] Appl. No.: 08/813,704

[22] Filed: Mar. 7, 1997

[51] Int. Cl.⁷ .......................... B32B 31/12; B32B 31/20; B05D 1/34
[52] U.S. Cl. .......................... 156/191; 156/187; 156/226; 156/249; 156/279; 156/324; 427/195; 427/201; 427/365; 427/374.4; 427/375
[58] Field of Search ..................................... 156/247, 249, 156/279, 226, 324, 187, 191; 427/195, 201, 365, 374.4, 375

[56] References Cited

U.S. PATENT DOCUMENTS

| | | |
|---|---|---|
| 2,584,980 | 2/1952 | Brennan . |
| 3,001,232 | 9/1961 | Martinak ..................................... 18/15 |
| 4,327,400 | 4/1982 | Muranaka et al. . |
| 4,345,954 | 8/1982 | Panchu ................. 156/247 X |
| 5,019,311 | 5/1991 | Koslow . |
| 5,189,092 | 2/1993 | Koslow . |
| 5,192,432 | 3/1993 | Andelman . |
| 5,200,068 | 4/1993 | Andelman . |
| 5,360,540 | 11/1994 | Andelman . |
| 5,415,768 | 5/1995 | Andelman . |
| 5,792,513 | 8/1998 | Koslow et al. ......................... 427/195 |

FOREIGN PATENT DOCUMENTS

| | | |
|---|---|---|
| 0 443 825 | 8/1991 | European Pat. Off. . |
| 4007201 | 9/1990 | Germany . |
| 04 068 512 | 3/1992 | Japan . |
| 04 075 313 | 3/1992 | Japan . |
| 04 088 619 | 3/1992 | Japan . |
| 1098078 | 3/1966 | United Kingdom . |
| 2 073 491 | 10/1981 | United Kingdom . |
| 2071417 | 9/1991 | United Kingdom . |
| 94 10698 | 5/1994 | WIPO . |

*Primary Examiner*—Curtis Mayes
*Attorney, Agent, or Firm*—Ohlandt, Greeley, Ruggiero & Perle

[57] ABSTRACT

An electrode is made by depositing a mixture of particulate carbon and very fine thermoplastic binder on the surface of a fluid permeable dielectric web. The coated web is then passed between a pair of rollers that apply heat to at least the Vicat softening point of the binder and simultaneously apply pressure to fuse the carbon and binder to the web. Two of such electrodes are employed to manufacture a flow-through capacitor suitable for use in water treatment.

19 Claims, 2 Drawing Sheets

6,022,436

ELECTRODE MANUFACTURING PROCESS AND FLOW-THROUGH CAPACITOR PRODUCED THEREFROM

TECHNICAL FIELD

This invention relates to a novel method for the continuous production of an electrode in the form of a dielectric web coated with a high surface area layer of an active material in the form of a particulate, electrically conductive substance. The electrically conductive substance is caused to adhere to the web by means of a thermoplastic binder present in a sufficiently small volume that it does not interfere with the electrical conductivity characteristics of the active material. There is further disclosed the manufacture of a novel flow-through capacitor employing the coated web as the capacitor dielectric and plates.

BACKGROUND ART

The closest known approaches to the web coating process of this invention are described in Koslow U.S. Pat. Nos. 5,019,311; 5,147,722; 5,189,092; 5,249,948; and 5,331,037, their parent applications, their corresponding foreign patent applications and patents, and the references cited therein. See also co-pending patent application Ser. No. 08/813,055, filed concurrently herewith by the present inventors and entitled "Continuous Solid State Web Coating Apparatus and Webs Produced Thereby," now U.S. Pat. No. 5,792,513. The closest known prior art to the flow-through capacitors of this invention are U.S. Pat. Nos. 5,192,432; 5,360,540; 5,415,768 inter alia of Marc D. Andelman.

The above-mentioned Koslow patents disclose processes for the production of composite materials which are characterized by primary particles interconnected by a binder material. Some of these processes require high pressure and shear or extrusion through a die with carefully controlled back pressure. These prior art processes are extremely useful in producing a wide variety of articles including extruded solid forms such as activated carbon filters.

The above-mentioned Andelman patents disclose capacitors designed to receive fluids therethrough for various applications such as chromatography and fluid purification. These capacitors operate by removing ionized particles and solutes by electrical attraction to the charged plates. In one embodiment, Andelman proposes a wound cylindrical capacitor having radial flow between the inside and the outside of the cylinder. Such an arrangement has the advantage of efficiency. However, in order to obtain such a construction, six or eight separate and individual layers must be wound around a central core. In accordance with the present invention, a cylindrical capacitor of somewhat similar configuration is obtained by use of a layered composite electrode produced by the method of this invention.

It would be desirable to impregnate, cover, or otherwise treat, a relatively fragile, fluid permeable, dielectric base material web with an electrically conductive material that has a high surface area and is also porous to fluid flow. One example would be a nonwoven or plastic web coated with carbon particles and binder particles on at least one side. Two such coated webs could be wound together as, for example, in the known method of manufacturing a metallized film capacitor. This would produce a capacitor capable of functioning in essentially the same manner as the prior art flow-through capacitors but would be much easier to manufacture. However, the fragile nature of the underlying base material would make it impractical to employ the known prior art techniques which require high pressure and shear. Furthermore, the most desirable binder materials are in the form of extremely finely divided particulate material which is difficult to employ because it is non-flowable due to the high innate cohesion between the particles created by electrostatic and van der Waal forces.

In the prior art referred to above, the powdered active material is caused to bind to the substrate by means of a thermoplastic material with which it is intimately mixed. However, the pressures and temperatures involved would not permit their application to fragile substrates such as the webs described herein. Accordingly, it is a primary object of the present invention to provide a method for continuously coating a relatively fragile web with a particulate conductive material and a very finely divided particulate thermoplastic binder. Another object is to produce a flow-through capacitor from such a web. Other objects, features, and advantages will become apparent from the following description and appended claims.

DISCLOSURE OF THE INVENTION

In accordance with the present invention a loose, dry composite mixture is formed which comprises particles of an electrically conductive material and particles of a thermoplastic binder. The binder particles are quite small in size, preferably on the order of 20 microns, and no greater than approximately 40 microns on average. The particle size of the electrically conductive material may be over a large range, for example 5–1500 microns. The small size of the thermoplastic binder particles causes them to adhere to the particles of the electrically conductive material by electrostatic and van der Waal forces. In addition to their tendency to stick to the particles of the electrically conductive material, the binder particles also have a high innate cohesion.

The composite powder may be uniformly applied to the surface of a moving dielectric web by means of a knurled roll dispenser or by other means well known in the prior art. The coated web can be preheated and then passed through the nip of a pair of laminating rollers, at least one of which is heated, that apply heat and elevated pressure to fuse the powder particles to each other and to the dielectric web. During this process, it is also possible to incorporate an additional dielectric web on the upper surface of the powder layer. This second web is generally not preheated and generally passes in contact with the unheated laminator roll. The electrically conductive powder now emerges between two layers of dielectric medium that provide strength and protection to the composite sheet.

If a second dielectric sheet has been used, it is thereafter peeled away with ease because its adhesion is relatively low because of its greater distance from the heated roll and lack of preheating. Next the remaining web is folded and combined with a third, electrically conductive, web such as graphite foil, expanded metal, etc. One edge of this third web is allowed to extend beyond the margin of the folded dielectric composite sheet. This combination is then passed through a heated laminator that applies heat and elevated pressure to cause all of the layers to fuse into a final composite electrode medium.

Two lengths of this final composite medium may be laid upon each other and rolled to form a cylindrical capacitor. Alternatively, two or more of these composite electrodes may be stacked upon each other to form a capacitor stack. The two edges of the electrode core extending beyond the composite edge are used to make electrical connections to end caps or other appropriate structures.

BEST MODE FOR CARRYING OUT THE INVENTION

Figure 2:
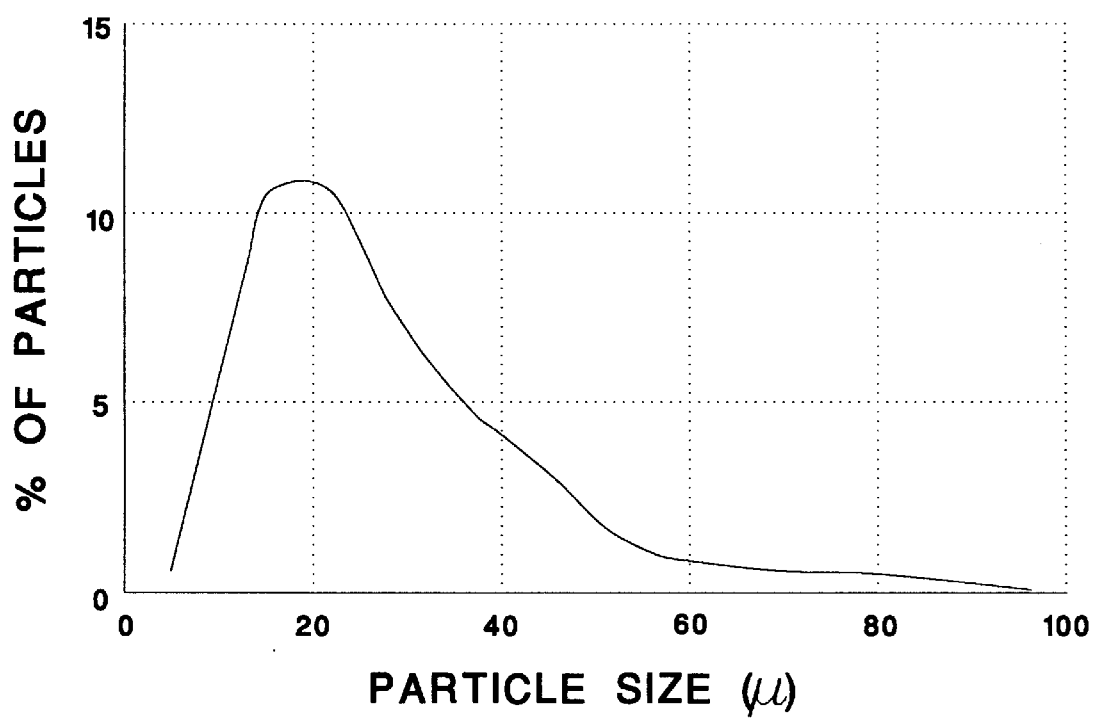
FIG. 2 is a graph showing the particle size distribution of a binder usable in this invention.

Any of a large number of electrically conductive particulate agents may be applied to an underlying web in accordance with this invention. The critical features of this invention, however, reside in the thermoplastic binder which is employed to coalesce the conductive particles and adhere them to the underlying web. For this purpose, the thermoplastic binder must be in the form of very small particles and must be present in a small enough volume that they do not interfere with the consolidation of the conductive powder into a continuous electrically conductive medium. Preferably, the binder particles will have an effective diameter of not more than 40 microns on average with an average optimum size of 20 microns or less. A binder which is suitable for the process of this invention may be produced from normally solid, synthetic organic polymeric thermoplastic resins by the method disclosed in U.S. Pat. No. 3,432,483 of Peoples, et al. Examples of suitable binders are Microthene® F, microfine polyolefin powders produced by Quantum Chemical Company such as, for example, their low density polyethylene designated FN-510 and their ethylene-vinyl acetate copolymer designated FE-532. FIG. 2 illustrates the typical particle size distribution of Microthene FN-510 powder. Similar suitable binders can be high density polyethylene, linear low density polyethylene, nylon, polypropylene, or other thermoplastic resins or some thermoset resins, such as dry thermoset resins sold by Plenco, Inc.

Figure 1:
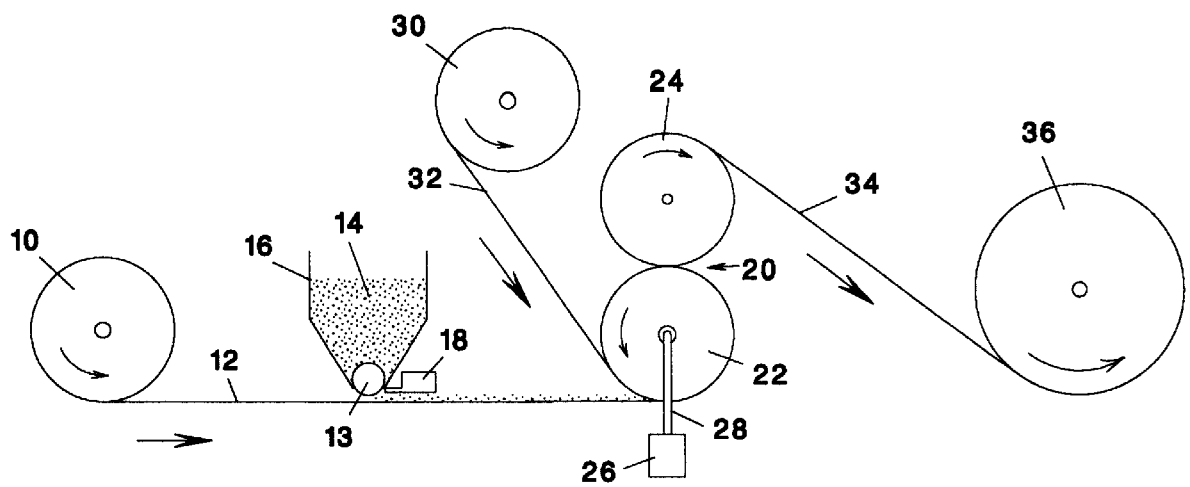
FIG. 1 is a schematic diagram illustrating apparatus for the practice of the method of this invention.

FIG. 1 illustrates an exemplary apparatus for the manufacture of an electrode in accordance with this invention. A supply roll 10 provides a web 12 of the substrate dielectric to be treated, such as a spun bonded nonwoven or other porous dielectric medium. Downstream from supply roll 10 is a knurled roller 13 positioned to receive the composite powder 14 of this invention from a hopper 16 and apply the powder to the upper surface of the web 12. The surface of the knurled roller 13 may be designed to provide a substantially continuous coating or, alternatively, a coating of a specific design such as, for example, stripes on the web surface. A brush 18 may be employed to aid in removing the composite powder from the knurled roller 13. Such apparatus is conventional. Thereafter, the web 12 is passed through the nip 20 between a heated idler roller 22 and a drive roller 24. A pneumatic cylinder 26 is connected via a rod 28 to the axle of the heated idler roller 22 to maintain a desired pressure on the web within the nip 20. In passing over the surface of the heated idler roller 22, the binder is heated to a temperature greater than its Vicat softening temperature as it enters the nip 20, the temperature being below the melting temperature of the binder. The temperature is also below the melting temperature of the electrically conductive material. Within this nip the binder material fuses under both heat and pressure with the conductive material and with the dielectric web, while the electrically conductive powder particles are pressed and consolidated into intimate electrical contact.

Note: The Vicat softening temperature is defined by Quantum Chemical Company, Cincinnati, Ohio, as " . . . the temperature at which the finished [thermoplastic] article becomes too soft to withstand stresses and keep its shape. It is the temperature at which a flat-ended needle of 1 mm cross section under a load of 1 kg penetrates 1 mm into a . . . specimen. In the Vicat test, the temperature of the specimen is increased at a uniform rate."

In the illustrated apparatus there is provided a second supply roll 30 of a web 32 which may be of the same or a different material from that of base web 12. In one configuration, this web is selected to be removable from the composite web being manufactured, its main function being to secure the particles through the fusion operation. (In another configuration, this web 32 could be an electrically conductive foil which would form an electrode capable of stacking in a linear arrangement or suitable for winding into the flow-through capacitor described below.) This web is also passed between the nip 20 of the rollers 22, 24 and on the top of the particulate material which is being fused. Accordingly, the web 34 which leaves the roller 24 is a composite sandwich web. Upon leaving the nip 20, the binder cools and hardens, thereby forming the desired composite. The composite web 34 passes onto a take-up roll 36.

The process can be arranged to carry out the application of a second capacitive layer of electrically conductive medium on the opposite side of the dielectric layer or the conductive foil layer by arranging two systems, such as shown in FIG. 1, in tandem and allowing a second layer of composite powder to be applied and fused. This would result in a composite structure similar in arrangement to the structure illustrated in FIG. 5.

EXAMPLE 1

Carbon Electrode

The substrate used was a 23 cm wide web 12 of dielectric material selected to be sufficiently "tight" to prevent passage of the particulate electrically conductive material, such as carbon, but porous to the water to be treated. It was a calendared meltblown non-woven polypropylene with $5\mu$ pore size, part number WD 902 supplied by Web Dynamics of East Stroudsburg, Pa. The composite powder mixture 14 was 17% by weight ethylene-vinyl acetate copolymer, (FE532 of U.S.I. Chemicals of New York, N.Y.), 5% by weight flake graphite ($20-30\mu$), 10% graphite powder (80/325 mesh), and 68% activated carbon (200–325 mesh).

The 23 cm wide upper web 32 was 0.8 ounce/sq. yard polyester. The webs moved at the rate of 0.6 meter/min and the composite powder was laid down in the amount of 310 $g/m^2$. The heated roller 22 was 25 cm in diameter and heated by hot oil to a temperature of 135° C. The binder reached its Vicat softening temperature of 75–80° C. in the nip. Pressure in the nip was maintained at approximately 72 $kg/cm^2$. This process produced a sandwich web 34.

Figure 3:
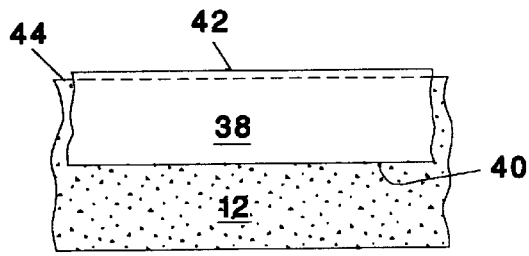
FIG. 3 is a plan view showing an intermediate step in the manufacture of a flow-through electrode.
Figure 4:
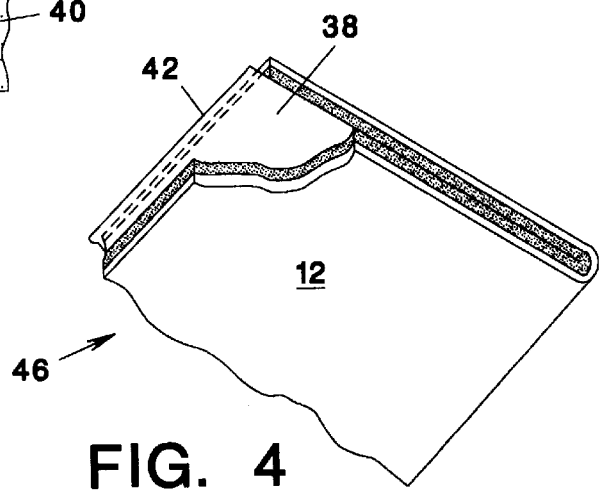
FIG. 4 is an isometric illustration, partially broken away, of a flow-through electrode produced by the method of this invention.

A suitably long piece of the sandwich web 34 was cut and the polyester layer of web 32 was peeled therefrom, leaving the exposed electrically conductive layer of web 12 having a coating of fused activated carbon, flake and powder graphite, and binder. Laid upon this fused coating was a 0.025 cm thick graphite foil 38 which was perforated to render it water permeable. As illustrated in FIG. 3, one edge 40 of the foil extended substantially along the centerline of the web 12, while the other edge 42 extended slightly beyond the edge 44 of the web. Although only a portion is shown, the foil extended substantially the length of the web 12. The coated web 12 was then folded along its centerline to enclose the inner edge 40 of the foil, while leaving its outer edge 42 exposed. The folded web was then passed between the nip 20 of the rollers 22, 24 to fuse the foil and web together. The result was the electrode 46 illustrated in FIG. 4 wherein the inner edge of the foil is protected and insulated and the outer edge remains extended beyond the composite web 12. It will be understood that the thickness of the web 12 is greatly exaggerated in order to show the construction. It will also be understood that folding over of the web 12 around the foil is a preferred construction. The foil could also extend the full width of the web and still function to form the flow-through capacitor to be described. However, in this preferred embodiment the non-extending edge is better protected. It will also be apparent that structures other than a foil could be employed. For example, an expanded nickel metal foil could serve the same function. Furthermore, other non-structural elements can be substituted for the foil, such as an additional layer of powdered electrically conductive material, which could be cast into and bonded within web 12.

EXAMPLE 2

Flow-through Capacitor

Figure 5:
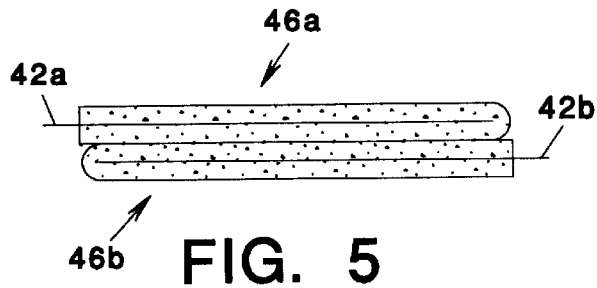
FIG. 5 is an end view of two lengths of the electrode of FIG. 4, in reversed relationship.
Figure 6:
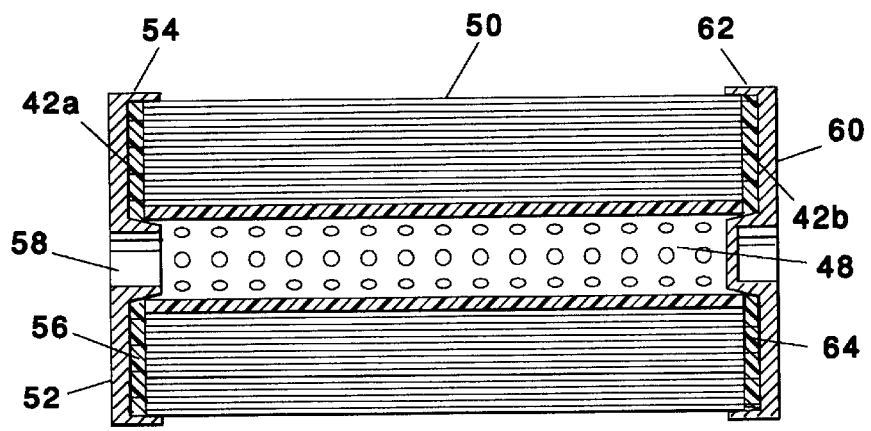
FIG. 6 is a horizontal cross section through a flow-through capacitor wound from the lengths shown in FIG. 5 in accordance with the invention.

Two pieces 46a, 46b of the electrode were cut to the desired length. One was reversed relative to the other and they were laid together as illustrated in FIG. 5 such that the extending edges 42a, 42b of the foils were on opposite sides. The two electrodes were then wrapped around a perforated cylindrical plastic core 48, as shown in FIG. 6. The number of turns depends upon the desired capacitance and can be readily ascertained by one skilled in the art. Upon completion, there was a cylindrical capacitor section 50. Extending from one end of the Upon completion, there was a cylindrical capacitor section 50. Extending from one end of the section was the foil edge 42a of one electrode and extending from the opposite end was the foil edge 42b of the other electrode.

An electrically conductive circular plastic end cap 52 having an encircling rim 54 was secured to one end of the capacitor section 50—making contact with foil edge 42a and secured by means of an electrically conductive potting compound 56. The end cap 52 provided an electrically conductive contact surface for uniform electrical supply along foil edge 42a and sealed electrode 46a of the flow-through capacitor which included a central opening 58 therethrough.

In like fashion, a second electrically conductive plastic end cap 60 having a similar encircling rim 62 was secured to the other end of the capacitor section 50—making contact with foil edge 42b and was similarly secured by means of an electrically conductive potting compound 64. This second end cap 60 similarly provided an electrically conductive contact surface for uniform electrical supply along foil edge 42b and sealed the other electrode 46b of the flow-through capacitor while providing a solid, fluid-impervious, wall.

The flow-through capacitor which results from this invention has water-permeable electrodes wrapped around a perforated hollow core 48. This permits radial flow through the cylindrical section—generally inwardly rather than outwardly. Similarly, fluid enters or leaves the capacitor through the end cap opening 58. Electrical connections to the end caps 52, 60 permit its connection into an electrical circuit.

A flow-through capacitor can also be constructed by stacking electrodes 46 in a fashion substantially similar to the structure illustrated in FIG. 5. This stack would be arranged within a suitable housing which would seal the non-foiled edges of the electrodes and provide electrically conductive contact surfaces or bus bars along each of foil edge 42a and 42b. Water or other fluid would be directed through the stack in an axial direction, exiting out the other end of the stack.

In both the wound cylinder and stack flow-through capacitors, an electrical current can be caused to flow between adjacent electrodes. When water or other fluids are forced through the capacitor, each electrode can attract oppositely charged ions and temporarily hold them within the composite medium. It will be apparent to one skilled in the art that the electrical current can be adjusted to attract certain ions, leaving other elements unaffected and hold such ions in a manner to serve either as an electrical storage device or a means for fluid purification. Furthermore, the polarity of each electrode can be reversed, releasing such captive ions and thereby allowing them to be washed out of the electrodes through a reverse, or other suitable, flow path.

It is believed that the many advantages of this invention will now be apparent to those skilled in the art. It will also be apparent that a number of variations and modifications may be made therein without departing from its spirit and scope. For example, the foregoing is directed to an electrode and capacitor primarily for water treatment. However, the invention is equally applicable to use with any liquid or gas, hence the use of the term "fluid" in the following claims. Accordingly, the foregoing description is to be construed as illustrative only, rather than limiting. This invention is limited only by the scope of the following claims.

We claim:

1. A process for manufacturing an electrode which comprises:

providing a substrate dielectric web;

preparing a mixture of a particulate electrically conductive material with a particulate binder material, such binder material having a particle size not exceeding approximately 40 microns on average;

applying the mixture to the substrate to coat a surface of said substrate web;

heating the binder material in the mixture coated on the surface of the substrate to at least the Vicat softening temperature of said binder material but below the melting temperature of the electrically conductive material; and thereafter applying pressure to said coated substrate surface to fuse the binder material and said particulate electrically conductive material to said web substrate surface.

2. The process of claim 1 comprising the additional step of depositing upon said mixture an upper layer of sheet material, whereby said substrate web, mixture, and upper layer are simultaneously subjected to said application of pressure.

3. The process of claim 2 wherein said pressure is applied by passing the coated web and upper layer through the nip of a pair of pressure rollers.

4. The process of claim 3 wherein said binder material is a synthetic organic polymeric resin.

5. The process of claim 1 wherein said pressure is applied by passing the coated web through the nip of a pair of pressure rollers.

6. The process of claim 1 wherein said binder material is a synthetic organic polymeric thermoplastic resin.

7. The process of claim 6 wherein said binder material is ethylene-vinyl acetate copolymer.

8. The process of claim 6 wherein said resin is nylon.

9. The process of claim 6 wherein said resin is polypropylene.

10. The process of claim 6 wherein said resin is polyethylene.

11. The process of claim 10 wherein said resin is low density polyethylene.

12. The process of claim 10 wherein said resin is high density polyethylene.

13. The process of claim 1 wherein said binder material is synthetic organic thermoset resin.

14. The process of claim 1 wherein said electrically conductive material is carbon.

15. The method of manufacturing a fluid permeable electrode which comprises:

providing a fluid permeable dielectric web having first and second opposed surfaces and first and second longitudinal edges;

preparing a mixture of a particulate electrically conductive material and a particulate binder material having a particle size not exceeding approximately 40 microns;

applying the mixture to the first surface of said web;

depositing upon said mixture an upper layer of sheet material;

heating said web, mixture, and upper layer to at least the Vicat softening temperature of said binder material but below the melting temperature of said binder material;

applying pressure to said web, mixture, and upper layer to fuse softened binder material and said particulate electrically conductive material to said web first surface;

peeling said upper layer of sheet material from said fused mixture;

depositing upon said fused mixture an electrically conductive, fluid permeable sheet having first and second opposed surfaces and first and second longitudinal edges;

heating said mixture to at least the Vicat softening temperature of said binder material but below the melting temperature of said binder material; and applying pressure to said web, mixture, and electrically conductive sheet to fuse softened binder material to said electrically conductive sheet.

16. The method of claim 15 wherein said electrically conductive sheet is deposited upon said fused mixture with its first longitudinal edge parallel to the first longitudinal edge of said web but displaced outwardly therefrom.

17. The method of claim 16 including the additional steps of:

forming the fluid permeable electrode in two substantially equal lengths, providing a first fluid permeable electrode and a second fluid permeable electrode;

positioning the dielectric web portion of said first fluid permeable electrode upon the fluid permeable sheet of said second fluid permeable electrode with the first longitudinal edge of said first web substantially aligned with the first longitudinal edge of said second web to form a composite elongated structure;

rolling said elongated structure into a hollow, substantially cylindrical, form with the first longitudinal edges of the respective electrically conductive sheets extending from opposite ends of said cylindrical form to form an electrical capacitor section.

18. The method of claim 17 including the additional steps of:

providing a hollow, substantially cylindrical, fluid permeable core upon which said elongated structure is rolled;

enclosing one end of said capacitor section by an electrically conductive first end cap forming a fluid impervious wall and making electrical contact with the first longitudinal edge of one of the electrically conductive sheets; and enclosing the other end of said capacitor section by an electrically conductive second end cap defining a fluid opening therethrough and making electrical contact with the first longitudinal edge of the other of said electrically conductive sheets.

19. The method of claim 16 wherein said electrically conductive sheet is deposited upon said fused mixture with its second longitudinal edge substantially centrally positioned upon said web, leaving substantially half of said web and fused mixture exposed; and folding said exposed portion of web and fused mixture over said electrically conductive sheet prior to the second heating step.

* * * * *